US010747895B2

(12) United States Patent
Peppe et al.

(10) Patent No.: US 10,747,895 B2
(45) Date of Patent: Aug. 18, 2020

(54) DISTRIBUTE BIG DATA SECURITY ARCHITECTURE

(71) Applicant: T-Mobile USA, Inc., Bellevue, WA (US)

(72) Inventors: Brett C. Peppe, Bellevue, WA (US); Gregory R. Reith, Federal Way, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 99 days.

(21) Appl. No.: 15/276,567

(22) Filed: Sep. 26, 2016

(65) Prior Publication Data
US 2017/0091477 A1  Mar. 30, 2017

Related U.S. Application Data (60) Provisional application No. 62/233,153, filed on Sep. 25, 2015.

(51) Int. Cl.
*H04L 29/06* (2006.01)
*G06F 21/62* (2013.01)

(52) U.S. Cl.
CPC ...... *G06F 21/6218* (2013.01); *G06F 21/6245* (2013.01); *H04L 63/102* (2013.01)

(58) Field of Classification Search
CPC ......... H04L 63/08; H04L 63/10; H04L 63/20; H04L 63/102; G06F 21/6218; G06F 21/6245
See application file for complete search history.

(56) References Cited

U.S. PATENT DOCUMENTS 6,108,583 A * 8/2000 Schneck ............... H04L 63/105
700/67
8,065,713 B1 11/2011 Vainstein et al.
(Continued)

FOREIGN PATENT DOCUMENTS

WO  2010106552 A2  9/2010
WO  2014130920 A1  8/2014

OTHER PUBLICATIONS

Michael J. Covington et al., Securing Context-Aware Applications Using Environment Roles, May 2001, ACM, pp. 10-20. (Year: 2001).*

(Continued)

*Primary Examiner* — Luu T Pham
*Assistant Examiner* — Fahimeh Mohammadi
(74) *Attorney, Agent, or Firm* — Han Santos, PLLC (57) ABSTRACT

This disclosure describes techniques for defining security measures of a secure data corridor that enables data feeds to transmit from an ingress point to an egress point, while maintaining a desired security protection. This disclosure further describes techniques to quantify the desired security protection by determining and further associating a data sensitivity rating with individual data feeds in transmit through the secure data corridor. In some examples, the data sensitivity rating of the secure data corridor may be locked at a default rating that is commensurate with access permissions of a subject or a data sensitivity rating of an adjoining secure data container. Alternatively, the data sensitivity rating may be dynamically set based on data feeds transmitting through the secure data corridor or set based on the data sensitivity rating of data feeds at an ingress point or egress point of the secure data corridor.

19 Claims, 7 Drawing Sheets

(56) References Cited

U.S. PATENT DOCUMENTS

| | | | |
|---|---|---|---|
| 8,285,983 B2 | 10/2012 | Fasbender | |
| 8,321,387 B2 | 11/2012 | Dettinger et al. | |
| 8,322,610 B2 | 12/2012 | Guthery | |
| 8,528,047 B2 | 9/2013 | Terzis et al. | |
| 8,561,127 B1* | 10/2013 | Agrawal | G06F 21/62 |
| | | | 713/154 |
| 8,590,018 B2* | 11/2013 | Thavasi | G06F 21/31 |
| | | | 726/4 |
| 8,639,625 B1 | 1/2014 | Ginter et al. | |
| 8,732,856 B2 | 5/2014 | Sack et al. | |
| 8,826,448 B2* | 9/2014 | Peckover | G06F 21/6245 |
| | | | 713/193 |
| 8,938,775 B1 | 1/2015 | Roth et al. | |
| 9,215,236 B2 | 12/2015 | Kennedy | |
| 9,881,176 B2 | 1/2018 | Goldfarb et al. | |
| 9,935,772 B1 | 4/2018 | Madisetti et al. | |
| 10,033,702 B2 | 7/2018 | Ford et al. | |
| 10,042,782 B2 | 8/2018 | Struttmann et al. | |
| 2006/0053158 A1 | 3/2006 | Hall et al. | |
| 2006/0059567 A1 | 3/2006 | Bird et al. | |
| 2006/0095762 A1 | 5/2006 | Hosokawa et al. | |
| 2006/0232826 A1 | 10/2006 | Bar-El | |
| 2008/0195858 A1 | 8/2008 | Nguyen | |
| 2010/0180337 A1* | 7/2010 | Bajekal | G06F 21/6227 |
| | | | 726/19 |
| 2010/0299362 A1 | 11/2010 | Osmond | |
| 2011/0078774 A1* | 3/2011 | Grube | G06F 11/1076 |
| | | | 726/5 |
| 2012/0124540 A1* | 5/2012 | Ishikawa | G06F 30/394 |
| | | | 716/115 |
| 2012/0124640 A1* | 5/2012 | Bender | G06F 21/6218 |
| | | | 726/1 |
| 2012/0210119 A1* | 8/2012 | Baxter | H04L 63/08 |
| | | | 713/150 |
| 2013/0219507 A1* | 8/2013 | Chang | G06F 21/10 |
| | | | 726/26 |
| 2014/0090085 A1 | 3/2014 | Mattsson et al. | |
| 2014/0090089 A1* | 3/2014 | D'Souza | H04L 63/08 |
| | | | 726/29 |
| 2014/0130147 A1* | 5/2014 | Bajekal | G06F 21/6227 |
| | | | 726/17 |
| 2014/0173450 A1* | 6/2014 | Akula | G06F 21/6245 |
| | | | 715/741 |
| 2014/0173686 A1* | 6/2014 | Kgil | H04L 63/205 |
| | | | 726/1 |
| 2014/0283107 A1 | 9/2014 | Walton et al. | |
| 2014/0373104 A1* | 12/2014 | Gaddam | H04L 63/105 |
| | | | 726/4 |
| 2015/0089575 A1 | 3/2015 | Vepa et al. | |
| 2015/0163206 A1 | 6/2015 | McCarthy et al. | |
| 2015/0256559 A1 | 9/2015 | Porras | |
| 2015/0271178 A1* | 9/2015 | Bhattacharya | G06F 16/33 |
| | | | 726/1 |
| 2015/0310188 A1 | 10/2015 | Ford et al. | |
| 2015/0324571 A1 | 11/2015 | Hernoud et al. | |
| 2015/0339497 A1 | 11/2015 | Kurian | |
| 2016/0072844 A1 | 3/2016 | Porras | |
| 2016/0275303 A1 | 9/2016 | Narayanaswamy et al. | |
| 2016/0277368 A1 | 9/2016 | Narayanaswamy et al. | |
| 2017/0041296 A1 | 2/2017 | Ford et al. | |
| 2017/0093913 A1 | 3/2017 | Summers et al. | |
| 2017/0237747 A1 | 8/2017 | Quinn et al. | |
| 2017/0264619 A1 | 9/2017 | Narayanaswamy et al. | |
| 2017/0264640 A1 | 9/2017 | Narayanaswamy et al. | |
| 2017/0277774 A1 | 9/2017 | Eigner et al. | |
| 2017/0364450 A1 | 12/2017 | Struttmann | |
| 2017/0364698 A1 | 12/2017 | Goldfarb et al. | |
| 2017/0364699 A1 | 12/2017 | Goldfarb et al. | |
| 2017/0364700 A1 | 12/2017 | Goldfarb et al. | |
| 2017/0364701 A1 | 12/2017 | Struttmann | |
| 2017/0366353 A1 | 12/2017 | Struttmann | |
| 2017/0373104 A1 | 12/2017 | Tatani et al. | |
| 2018/0205552 A1 | 7/2018 | Struttmann et al. | |

OTHER PUBLICATIONS

R.W. Conway et al., On the Implementation of Security Measures in Information, Apr. 1972, ACM, vol. 15, pp. 211-220. (Year: 1972).*

Yi-Sheng Shiu et al., Physical Layer Security in Wireless Network: A Tutorial, Apr. 15, 2011, IEEE, vol. 18, Issue: 2, pp. 66-74. (Year: 2011).*

Abdulrahman A. Almutairi et al., Risk-Aware Virtual Resource Management for Multitenant Cloud, Sep. 2014, vol. 1, Issue: 3, pp. 34-44. (Year: 2014).*

"International Search Report and Written Opinion" for PCT Application No. PCT/US16/53827 dated Jan. 11, 2017, 12 pages.

The Non-Final Office Action for U.S. Appl. No. 15/394,148 dated Oct. 1, 2018, 17 pages.

International Search Report and Written Opinion for PCT Application No. PCT/US2017/068680 dated Apr. 26, 2018, 12 pages.

International Search Report and Written Opinion for PCT Application No. PCT/US2017/068685 dated Apr. 24, 2018, 12 pages.

The Non-Final Office Action for U.S. Appl. No. 15/394,170 dated Aug. 28, 2018, 16 pages.

U.S. Appl. No. 15/394,148, Final Office Action dated Mar. 19, 2019, 8 pages.

U.S. Appl. No. 15/394,170, Final Office Action dated Mar. 21, 2019, 5 pages.

European Patent Application 16849888.9, Search Report, dated Apr. 12, 2019, 11 pages.

U.S. Appl. No. 15/394,148, Notice of Allowance dated Jun. 24, 2019, 51 pages.

* cited by examiner

| Control | Up | Down |
|---|---|---|
| Read | 0 | 1 |
| Write | 1 | 0 |

DISTRIBUTE BIG DATA SECURITY ARCHITECTURE

RELATED APPLICATIONS

This application claims priority to a commonly owned U.S. Provisional Patent Application No. 62/233,153 filed on Sep. 25, 2015, and titled "Distributed Big Data Security Architecture," which is herein incorporated by reference in their entirety.

BACKGROUND

Traditional information technology (IT) architecture have relied on centralized computing structures, whereby all or most of the processing and computing is performed on a central server. Centralized computing can enable the deployment of central server computing resources, administration, and management. Typically, computational processing involves the extraction, transformation and loading of a resultant data feeds by the centralized computing structure.

However, cost and performance inefficiencies of centralized computing structures have steered IT architectures towards decentralized computing structures, whereby data feeds are extracted, uploaded to a decentralized computing platform and then transformed. Doing so provides cost and performance efficiencies since the infrastructure to perform the computational processing can be outsourced to an entity that specializes in such.

As decentralized computing develops, both the velocity and diversity of data can cause some security measures to have an impact on latency, scalability, and recovery performance. Thus, security can be viewed as a service constraint. Thus there is a need to balance security constraints with other competing service constraints when optimizing operation requirements of a platform.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes techniques for defining security measures of a "secure data corridor" that enables data feeds to transmit from an ingress point to an egress point, while maintaining a desired security protection. The term "secure data corridor" as used herein may describe a communication channels used to transmit data feeds from a source location (i.e. ingress point) to a destination location (i.e. egress point). The techniques described herein further associate a secure data corridor with security measures that mandate confidentiality protection and data integrity protection that is commensurate with the nature of the data feed. For example, a data feed that relates to proprietary vendor data that is preferentially withheld from public dissemination may be associated with a less sensitive security measure when compared with a data feed that that relates to personal consumer information that must be withheld from public dissemination. In various examples, security measures may be defined, and enforced by explicit, read, write, import and export provisions expressly associated with data feeds. Further, any other regime that is definable by a developer or an administrator, may be used to define security measures.

In various examples, data items may be classified by use-case, and risk controls may be applied based on the sensitivity of data that is maintained within each use case. Each use case may be classified and assigned to "data sensitivity rating." The term "data sensitivity rating" is used herein to describe a rating, or score, given to a data feed that quantifies the security measure that mandates confidentiality protection and data integrity protection. Using the above mentioned example, a data feed that is associated with personal consumer information to be withheld from public dissemination is likely to be assigned a more sensitive, that is higher, data sensitivity rating, relative to a data feed that relates to proprietary vendor data that is preferentially withheld from public dissemination.

Each data sensitivity rating may prompt one or more control parameters that protect the confidentiality and integrity of the data feed. The one or more control parameters may include principles such as no read-up, no write-down, tranquility, explicit read-in, and explicit write-out. The 'no read-up' principle refers to a condition whereby a subject at a given security level may not read a data feed at a high security level. A 'no write-down' principle refers to a condition whereby a subject at a given security level may not write to a data feed to a less sensitive security level. The term "subject" as used herein describes a user, a non-user entity, a secure data container, or any other data structure requesting access permissions to data feeds within a secure data container, and via a secure data corridor.

In various examples, the classification of a "data sensitivity rating" may be associated directly with data elements, and set by predetermined rules. In some examples, a default data sensitivity rating may be assigned to a secure data corridor. In other examples, the data sensitivity rating may be based on access privileges associated with the subject. Further, the data sensitivity rating of the secure data corridor may be dynamically set by interrogating the nature of the data feed that is transmitting through the secure data corridor. In some examples, the data sensitivity rating may be set in substantially real-time.

The term "data feed" as used herein describes a mechanism by which data can be transferred from a source location. A data feed may include one or more data elements, which in turn are associated with data objects. A data feed may be assigned a default control parameter that applies to all data elements in the feed. A data feed may have default controls and acquired controls. Acquired controls may supersede default controls. The ability to set default controls on a data feed may facilitate loading data into the cluster that requires transformation after loading, but still requires protection.

The term "data element" as used herein describes the physical and logical characteristics of an associated data type. Further, a data element may define a data type as a string, integer, float, or object. The data elements map to data objects, which in turn store the data value at a particular storage location.

In some examples, the control parameters are assigned to the data objects. The data elements that map to the data objects inherit control parameters from the data objects. Further, the data feed that maps to the data elements inherit the control parameters from the data elements, and ultimately from the data objects. The level of control parameters is dependent on the use case. Thus, the security model may be customized for different use cases. In other words, a use case may be associated with a specific data sensitivity rating, and all data objects associated with the use case may be assigned that same, specific data sensitivity rating. Thus, a subject with access to a use case may have access to all data and services that are assigned to the use case provided that the subject retains the requisite access permissions.

Each use case, may have its own namespace, which can be enforced by a resource management platform. Privileges and permission are attached to the namespace. The term 'namespace' is used herein to describe a set of symbols that are used to organize objects of various kinds, so that these objects may be referred to by name. In a non-limiting example, a namespace may include file systems, programming languages, and computer networks and distributed systems. Further, a namespace may also include a secure data container.

In various examples, a subject may be added to an Access Control List (ACL) on the authentication service principals in order to gain access to a secure data corridor. Generally, a subject assigned to a given data sensitivity rating may access all data within that same classification.

This disclosure further describes techniques that illustrate multiple layers of authentication, authorization, and auditing of separate platform levels. Thus, a single point of attack (SPOA) in the security trust chain can be avoided as any successful attack would need to be of a synchronized multi-point nature. Elements of a defense in depth may include controlling access to the resource management platform by an authentication server entry. Authentication may be performed by an Active Directory whereby a subject may provide a set of credentials that confirm their identity. In a non-limiting example, the credentials may include a username, password, or other biometric identifier. Further, authorization to access a secure data container, via secure data corridor is dependent on the assigned access privileges and the data sensitivity rating of an associated use case and data feed within the secure data container.

A secure data corridor may comprise of a secure data container and trust chain vertices. A trust chain is created by a directed graph of vertices between SDC. The traversal of a given trust chain not only verifies the integrity of the chain, but also enables an audit mechanism. The secure data container is, in essence, embedded within the data corridor. The trust chain vertices define logical input and output pathways to the embedded data container. In other words, a secure data corridor connotes a transport mechanism and in its basic pathway operates as a migration pathway of physical data.

In various examples, the secure data corridor may correspond to a link layer, a network layer, a transport layer, or an application layer of a transmission control protocol (TCP) and internet protocol (IP). In a non-limiting example, a secure data corridor may include one input, one output, and one container. In a second non-limiting example, a secure data corridor may include one container with one input and no outputs. In this example, the SDC can acts as a secure sink where data of an unknown sensitivity rating can be staged prior to being class-rated into other containers, and other secure data corridors. In a third non-limiting example, the secure data corridor may include a secure data container with multiple outputs and no input. In this example, the secure data corridor input may be disconnected once data has been migrated. The multiple outputs, that is vertices, may connect to several other secure data corridors.

The term "data container," as used herein, describes a data structure that includes data items associated with the operation of a particular application. For example, a data container of a particular application and its dependencies may include an operating system, one or more data item libraries, configuration files, application binaries, and other parts of a technology stack used for execution of the particular application. Unlike a traditional virtual machine, a data container may hold its application and any dependencies, however a same operating system kernel and libraries can be shared between multiple containers running in a host environment.

The principles described herein may be applicable to any distributed computing environment. Historical protection techniques include network (IP address), firewall (Ports, Services), platform (Folder, Share) and data (Schema, Table) segmentation.

The term "techniques," as used herein, may refer to system(s), method(s), computer-readable instructions, module(s), algorithms, hardware logic, and/or operation(s) as permitted by the context described above and throughout the document.

Figure 1:
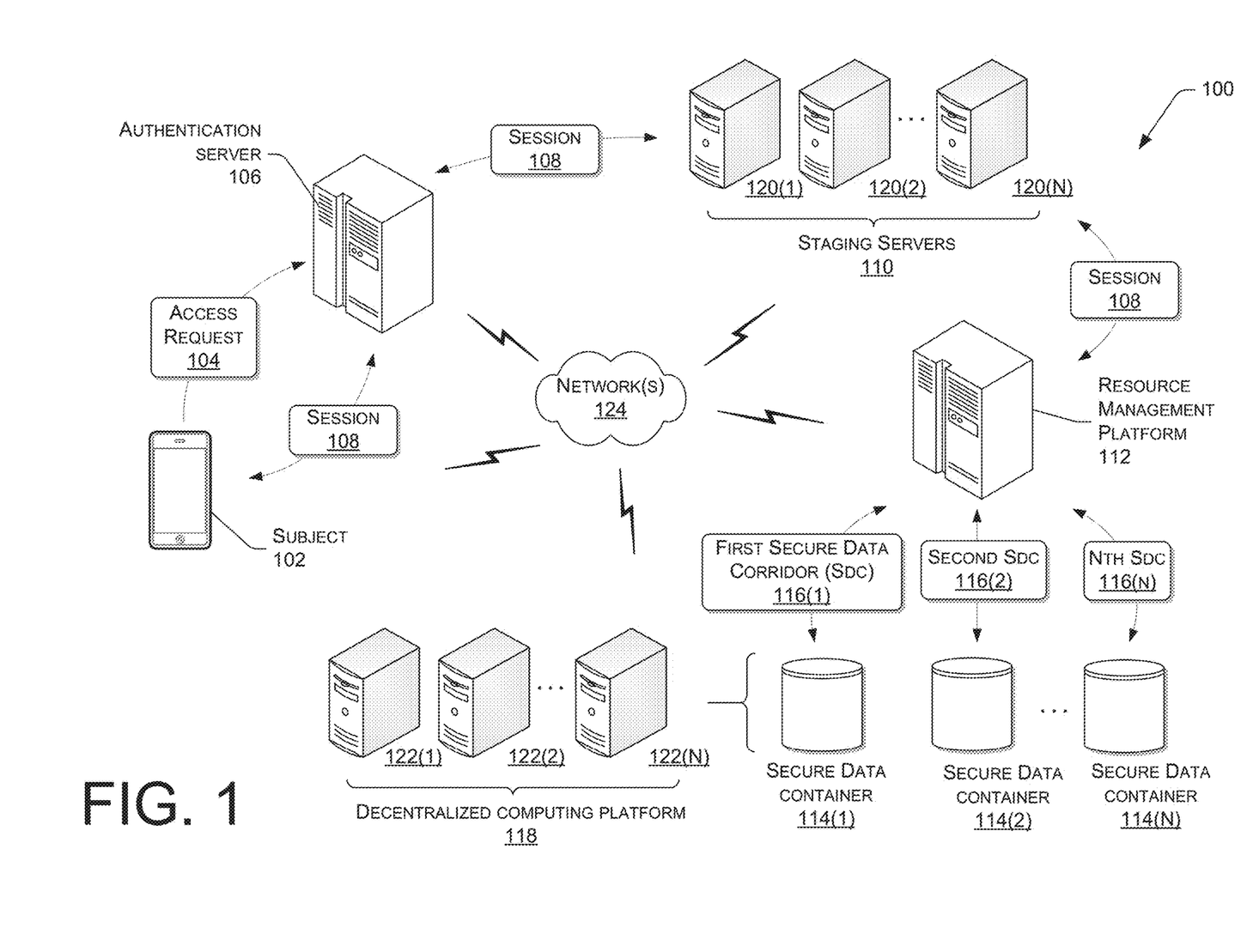
FIG. 1 illustrates a schematic view of a computing environment 100 that facilitates a subject establishing a secure session between a subject and a secure data container via a secure data corridor.

FIG. 1 illustrates a schematic view of a computing environment 100 that facilitates a subject establishing a secure session between a subject and a secure data container via a secure data corridor.

In the illustrated example, the subject 102 may transmit an access request 104 to an authentication server 106. In some examples, the authentication server 106 may perform authentication by an Active Directory whereby the subject 102 may provide a set of credentials that confirm their identity. In a non-limiting example, the credentials may include a username, password, or other biometric identifier associated with the subject.

In various examples, the subject 102 may correspond to a user, a non-user entity, a secure data corridor, or any other data structure that is capable of requesting access permissions to data feeds within a secure data container.

The subject 102 may interface with the authentication server 106 via any sort of electronic device, such as a cellular phone, a smart phone, a tablet computer, an electronic reader, a media player, a gaming device, a personal computer (PC), a laptop computer, etc. Further, the electronic device of the subject 102 may include a subscriber identity module (SIM), such as an eSIM, to identify the electronic device of the subject 102 to a telecommunication service provider network (also referred to herein as "telecommunication network").

In the illustrated example, in response to authenticating the subject 102, a session 108 is initiated via the authentication server 106 between the subject 102, through one or more staging server(s) 110. The goal of a decentralized cluster security policy must be to balance the need to provide scalable aggregation while still maintaining isolation based on security classifications. Isolation may be based on authorization and via the one or more staging server(s) 110.

Further, the one or more staging server(s) 110 are communicatively connected to a resource management platform 112. The resource management platform 112 may establish a communicative connection between a subject 102 and one or more secure data container(s) 114(1), 114(2), or 114(N), via a secure data corridor 116(1), 116(2), and 116(N) respectively. In various examples, the secure data corridor 116(1), 116(2), and 116(N) correspond to a link layer, a network layer, a transport layer, or an application layer of a transmission control protocol (TCP) and internet protocol (IP). In a non-limiting example, a secure data corridor may include one input, one output, and one container. In a second non-limiting example, a secure data corridor may include one container with one input and no outputs. The one or more secure data containers 114(1), 114(2), or 114(N) may be stored within a decentralized computing platform 118. The one or more secure data containers 116(1), 116(2), or 116(N) may include a data structure that includes data items associated with the operation of a particular application. For example, a data container of a particular application and its dependencies may include an operating system, one or more data item libraries, configuration files, application binaries, and other parts of a technology stack used for execution of the particular application.

The one or more staging server(s) 110 and the decentralized computing platform 118 may operate on one or more distributed computing resource(s), respectively. The one or more distributed computing resource(s) may include one or more computing device(s) 120 and 122, respectively, that operate in a cluster or other configuration to share resources, balance load, increase performance, provide fail-over support or redundancy, or for other purposes. The one or more computing device(s) 120 and 122 may include one or more interfaces that enable communications with electronic device(s), such as an electronic device associated with the subject 102, via one or more network(s) 124.

In the illustrated example, the one or more network(s) 142 may include public networks such as the Internet, private networks such as an institutional and/or personal intranet, or some combination of private and public networks. The one or more network(s) 124 can also include any type of wired and/or wireless network, including but not limited to local area network (LANs), wide area networks (WANs), satellite networks, cable networks, Wi-Fi networks, Wi-Max networks, mobile communications networks (e.g. 3G, 4G, and so forth), or any combination thereof.

Figure 2A:
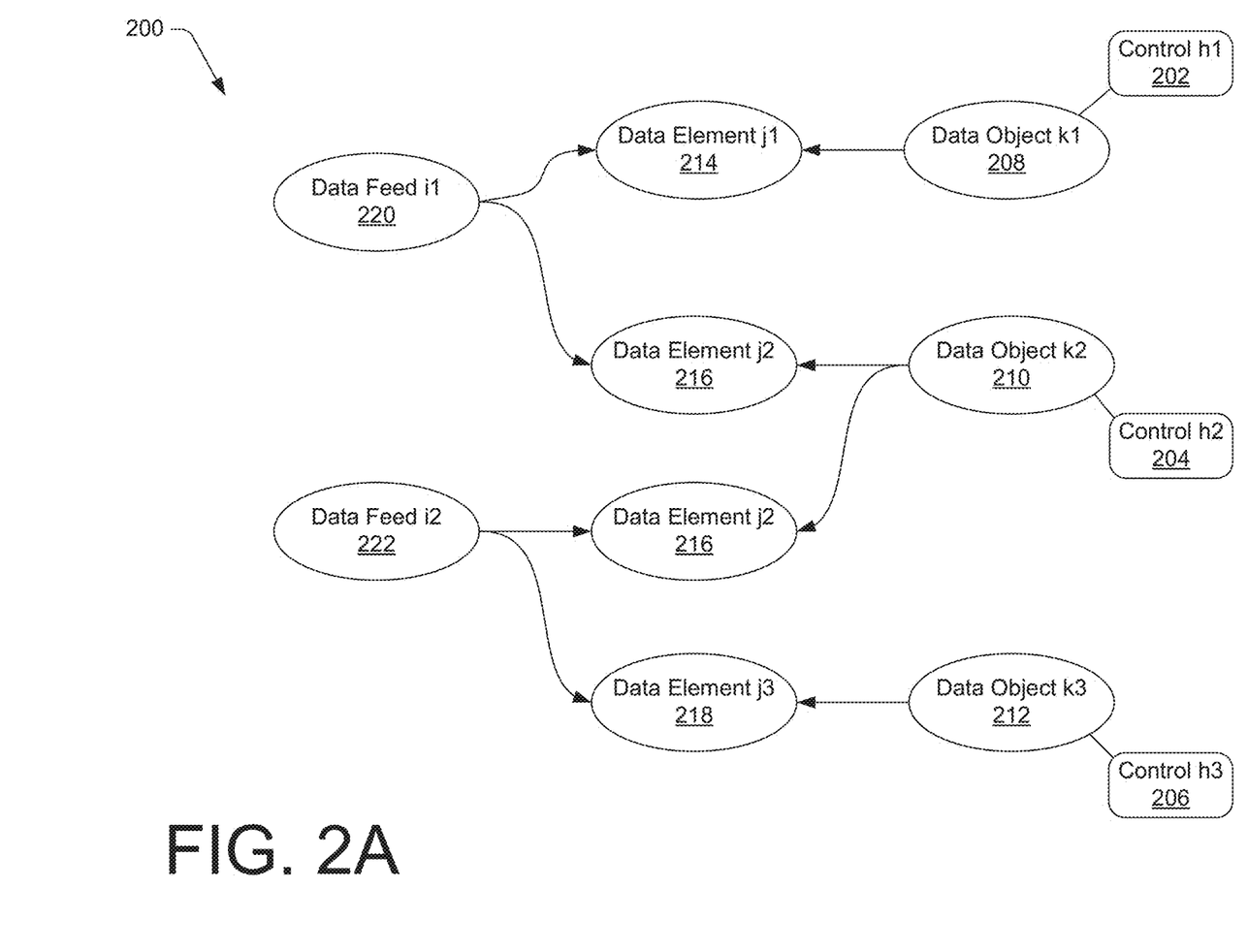
FIG. 2A illustrates a block diagram of an informational graph that describes the relationship between data objects, data elements, and data feeds within a use-case and/or secure data container.

FIG. 2A illustrates a block diagram of an informational graph 200 that describes the relationship between data objects, data elements, and data feeds within a use-case and/or secure data container. In the illustrated example, control parameters 202, 204, and 206 may be assigned to data objects 208, 210, and 212 respectively. The control parameters may include principles such as no read-up, no write-down, tranquility, explicit read-in, and explicit write-out. The 'no read-up' principle refers to a condition whereby a subject at a given security level may not read a data feed at a high security level. A 'no write-down' principle refers to a condition whereby a subject at a given security level may not write to a data feed to a less sensitive security level.

In the illustrated example, the data elements 214, 216, and 218 may map to the data objects 208, 210, and 212 and inherit the respective control parameters 202, 204, and 206 of the data objects 208, 210, and 212. A data element may define the physical and logical characteristics of an associated data type. For example, a data element may define a data type as a string, integer, float, or object. Further, a data element may further define a risk rating or a generic sensitivity rating of the associated data. In some examples, sensitivity may change over time. Sensitivity may also change to reflect a directed or explicit sensitivity policy. Further, a data element may define a data type as a string, integer, float, or object. The data elements map to data objects, which in turn store the data value at a particular storage location.

In the illustrated example, the data feeds 220 and 222 that maps to the data elements inherit the control parameters from the data elements 214, 216, and 218, and ultimately from the data objects 208, 210, and 212.

Figure 2B:
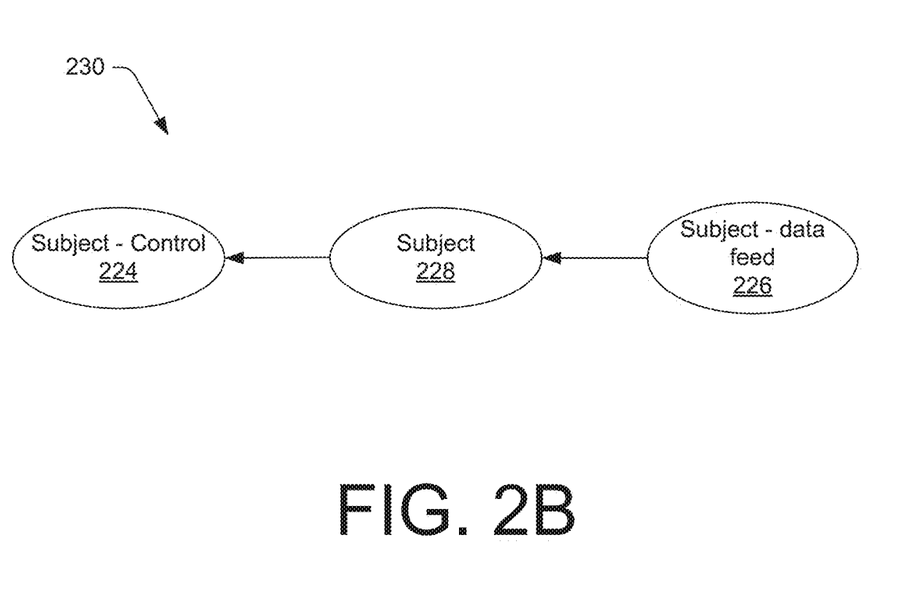
FIG. 2B illustrates a block diagram of a diagraph that represents subject permissions to a specific control and a specific data feed.

FIG. 2B illustrates a block diagram of a diagraph that represents subject permissions to specific control parameters 224 and a specific data feed 226. In the illustrated example, permissions associated with the subject 228 are bound to specific control parameters 224 and stored in a list of triples 230 (i.e. subject, control, and data feed) that tie the subject 228 to specific controls, and correspondingly the subject to the data feeds that are tagged by the specific controls. In some examples, the subject 228 may be granted access permissions to data feeds, whereby the nature of access is governed by the specific control parameters specified in the list of triples 230. The data feeds 226 and specific control parameters 224 may be explicitly assigned. Alternatively, or additionally, the subject 228 may be granted access to all data elements that are qualified by a specific control parameter.

Further, the resource management platform may interrogate the list of triples 230 associated with the subject to determine privileged data feeds as well as the controls that determine the access rights to those data feeds. The control parameters 224 may be expressed as a data sensitivity lattice of varying levels as further described in FIG. 3.

Figure 3A:
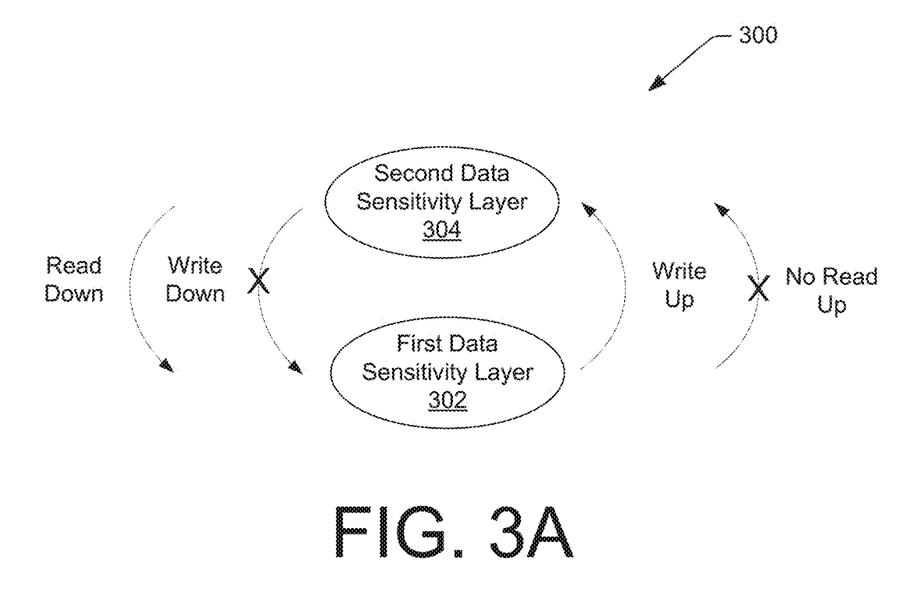
FIG. 3A illustrates a block diagram of an exemplary permission lattice associated with granting access privileges to a subject.
Figure 3B:
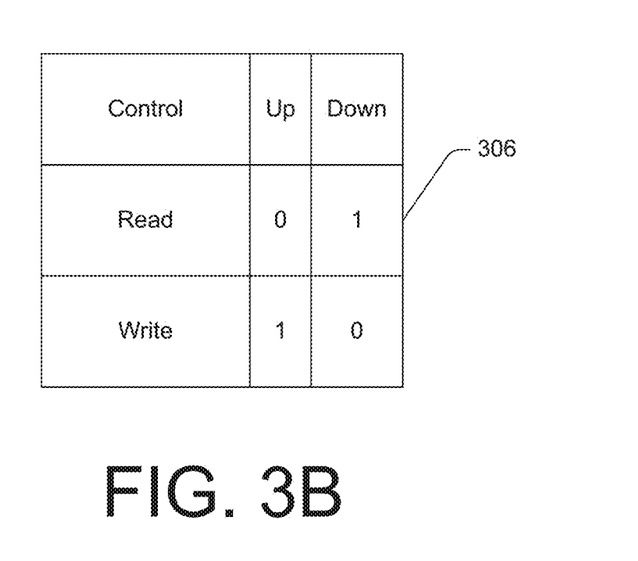
FIG. 3B illustrates a data sensitivity lattice for classifying control to for the control level of data feeds.

FIG. 3A illustrates a block diagram of an exemplary, data sensitivity lattice 300 associated with granting access permissions to a subject. In various examples, a subject may correspond to a user, a non-user entity, a secure data container, or any other data structure requesting access privileges. Particularly, FIG. 3A illustrates a block diagram of a data sensitivity lattice 300. In some examples, the data sensitivity lattice 300 may include a first data sensitivity layer 302 and a second data sensitivity layer 304. In the illustrated example, the first data sensitivity layer 302 may be associated with a first set of data items that mandate the least security measures for data confidentiality and data integrity protection. In a non-limiting example, the first set of data items may correspond to proprietary vendor data that is preferentially withheld from public distribution. Comparatively, the second data sensitivity layer 304 may be associated with a second set of data items that mandate more data security measures relative to the first data sensitivity layer 302, for data confidentiality and data integrity protection. In a non-limiting example, the second set of data items may correspond to personal consumer information that must be withheld from public distribution. For illustrative purposes only, FIGS. 3A and 3B present a two-layer, data sensitivity lattice 300. It is noteworthy that the data sensitivity lattice 300 may be defined to include any number of layers favored by a developer or administrator.

Further, FIG. 3A illustrates the relative flow of read and write permissions between the first data sensitivity layer 302 and the second data sensitivity layer 304. It is noteworthy, that although FIG. 3A describes read and write permissions, permissions may further include import permissions, export permissions, or any other permission regime definable by a developer or administrator. In the illustrated example, a subject with access permission to the first data sensitivity layer 302 may write data items to the second data sensitivity layer 304, however the subject may not read data items within the second data sensitivity layer 304. In other words, the subject may add (i.e. write) data items to the more sensitive, second data sensitivity layer 304, however the subject may not access, that is read, data items within the more sensitive, second data sensitivity layer 304.

FIG. 3A further illustrates that a subject with access permission to the second data sensitivity layer 304 may read data items within the first data sensitivity layer 302, however the subject may not write data items within the first data sensitivity layer 302. In other words, the subject may read data items within the less sensitive, first data sensitivity layer 302, however the subject may not add (i.e. write) data items to the less sensitive, first data sensitivity layer 302.

It is noteworthy that a subject with access permission to the first data sensitivity layer 302 may read data items and write data items within the first data sensitivity layer 302. Similarly, a subject with access permission to the second data sensitivity layer 304 may read data items and write data items within the second data sensitivity layer 304. Note that the terms data sensitivity layer and data sensitivity rating may be used interchangeably to describe the data sensitivity of a data item. Further the term data item may be used interchangeably to describe data feed.

FIG. 3B illustrates a data sensitivity lattice 306 that associates control parameters with data feeds. The control parameters are tied to data feeds. The control parameters may include read, write, export, and import parameters. In a non-limiting example, consider a subject with access permission to the second data sensitivity layer 304. As illustrated in FIG. 3A, the subject may read data items within the first data sensitivity layer 302, but may not add (i.e. write) data items to the first data sensitivity layer 302. The write limitation ensures that the subject may avoid inadvertently having more sensitive data items from the second data sensitivity layer 304 being added to the less sensitive, first data sensitivity layer 302. The data sensitivity lattice 306 of FIG. 3B reflects the same, except access permissions are presented from the perspective of the data feed, rather than the subject.

For example, FIG. 3A illustrates the second data sensitivity layer 304 as the most data sensitivity layer. Thus, the second data sensitivity layer 304 can only interact downward with the first data sensitivity layer 302. In FIG. 3B, the interaction of the second data sensitivity layer 304 with the first data sensitivity layer 302 is reflected in the 'down' column of the data sensitivity lattice 306. The 'down' column indicates a capability to read down (i.e. '1' in the read-down cell), and an inability to write down (i.e. '0' in the write-down cell).

Similarly, as shown FIG. 3A, a subject with access permissions to first data sensitivity layer 302 may not read data contained within the second data sensitivity layer 304, because the more sensitivity of the second data sensitivity layer 304 represents more sensitively classified data. Using the previous example of proprietary vendor data and consumer personal data, a subject with permission access to proprietary vendor data (i.e. classified as first data sensitivity layer 302) cannot read the consumer personal data (i.e. classified as the second data sensitivity layer 304).

Figure 4:
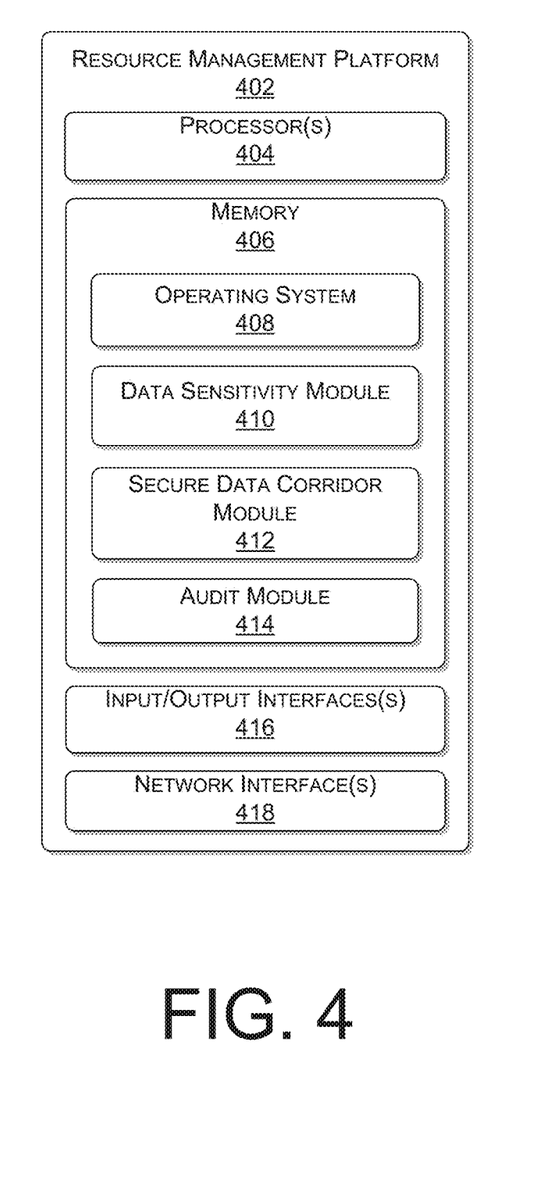
FIG. 4 illustrates a block diagram of a resource management platform that can establish a communicative connection between a subject device and a secure data container via a secure data corridor.

FIG. 4 illustrates a block diagram of a resource management platform 402 that can establish a communicative connection between a subject and a secure data container via a secure data corridor. The secure data corridor may be configured with a data sensitivity rating that is substantially similar to a data sensitivity rating of an adjoining secure data container. In some examples, the subject may correspond to a user device, a non-user entity device, or another adjoining secure data container.

In the illustrated example, the resource management platform 402 may correspond to resource management platform 112. Further, the resource management platform 402 may include one or more processor(s) 404 that are operably connected to memory 406. In at least one example, the one or more processor(s) 404 may be a central processing unit(s) (CPU), graphics processing unit(s) (GPU), a both a CPU and GPU, or any other sort of processing unit(s). Each of the one or more processor(s) 404 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 404 may also be responsible for executing all computer applications stored in the memory, which can be associated with common types of volatile (RAM) and/or nonvolatile (ROM) memory.

In some examples, memory 406 may include system memory, which may be volatile (such as RAM), non-volatile (such as ROM, flash memory, etc.) or some combination of the two. The memory may also include additional data storage devices (removable ad/or non-removable) such as, for example, magnetic disks, optical disks, or tape.

The memory 406 may further include non-transitory computer-readable media, such as volatile and nonvolatile, removable and non-removable media implemented in any method or technology for storage of information, such as computer readable instructions, data structures, program modules, or other data. System memory, removable storage and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 406 may include an operating system 408, a data sensitivity module 410, a secure data corridor module 412, and an audit module 414. The operating system 408 may be used to implement the data sensitivity module 410 and the secure data corridor module 412. The operating system 408 may be any operating system capable of managing computer hardware and software resources. The data sensitivity module 410, the secure data corridor module 412, and audit module 414 may include routines, program instructions, objects, and/or data structures that perform particular tasks or implement particular abstract data types.

In the illustrated example, the data sensitivity module 410 may determine the data sensitivity rating to assign to a secure data corridor. In some example, the data sensitivity module 410 may detect a data sensitivity rating at an ingress and egress point of a secure data corridor. The ingress and egress points may interchangeably correspond to a subject and a secure data container, depending on the flow of data feeds. Thus, the data sensitivity module 410 may further assign a data sensitivity rating to the secure data corridor that corresponds with the determined data sensitivity rating at the ingress and egress points.

In a non-limiting example, the data sensitivity module 410 may quantify a data sensitivity rating of secure data corridor based on access permissions associated with a subject. For example, the data sensitivity module 410 may detect that access permissions associated with the subject may limit the data sensitivity rating of data feeds that the subject may access. For example, if a subject is permitted to access data feeds with a first data sensitivity rating, whereby the first data sensitivity rating is less sensitive (i.e. mandates less data security measures for data confidentiality and data integrity protection) than a second data sensitivity rating, the data sensitivity module 410 may associate the first data sensitivity rating to a secure data corridor that establishes a session link between a secure data container and the subject. Doing so ensures that data feeds that egress from the secure container to the subject comply with access permissions of the subject and do not include data feeds that may be more sensitive (i.e. mandate more data security measures for data confidentiality and data integrity protection) than permitted by the subject access permissions.

In another non-limiting example, the data sensitivity module 410 may quantify a data sensitivity rating of the secure data corridor based on the data sensitivity rating of incoming data feeds that ingress from the subject to a secure data container. In other words, the data sensitivity rating of the secure data corridor may be based on the data sensitivity rating of incoming data feeds that are transmitting into the secure data container, rather than data feeds being accessed by the subject from the secure data container. In this example, the data sensitivity module 410 may quantify a data sensitivity rating for incoming data feeds and associate that data sensitivity rating to the secure data corridor that establishes a session link between the subject and the secure data container. Doing so ensures that incoming data feeds transmitting from the subject to the secure data container are protected while transmitting through the secure data corridor.

Further, in another non-limiting example, the data sensitivity module 410 may quantify a data sensitivity rating of the secure data corridor based on the data sensitivity rating of data feeds that transmit through the secure data corridor. In other words, the data sensitivity module 410 may detect the data sensitivity rating of data feeds transmitting through the secure data corridor, and dynamically set a substantially similar data sensitivity rating for the secure data corridor. A benefit of this approach is that in some instances, data feeds may have an unknown data sensitivity rating. As a precautionary measure, these data feeds tend to be assigned a high data sensitivity rating until determined otherwise. Thus to avoid assigning a secure data corridor with an arbitrary, and unnecessarily high data sensitivity rating that is based on data feed with unknown data sensitivity ratings transmitting through the secure data corridors, the data sensitivity module 410 may progressively adjust the data sensitivity rating of the secure data corridor in response to progressively quantifying the unknown data sensitivity ratings of the data feeds.

Additionally, the data sensitivity module 410 may lock the data sensitivity rating of a secure data corridor based at least in part on the data sensitivity rating of the adjoining secure data container. For example, a secure data container may have assigned a particular data sensitivity rating based at least in part on an associated use case. Thus, by locking the data sensitivity rating of the secure data corridor, the data sensitivity module 410 may ensure that data feeds that transmit through the secure data corridor comply with the data sensitivity rating of the use case.

In the illustrated example, the secure data corridor module 412 may establish a secure data corridor between a subject device and a secure data container. In various examples, the secure data corridor may correspond to a link layer, a network layer, a transport layer, or an application layer of a transmission control protocol (TCP) and internet protocol (IP). Further, secure data corridor module 412 may assign the secure data corridor with a data sensitivity rating that is determined by the data sensitivity module 410.

In the illustrated example, the audit module 414 facilitate a developer or administrator to audit an operation of the resource management platform. The audit module 414 may identify access permissions associated with a subject and compare the access permissions with control parameters of the data feeds. Further, the audit module 414 may interrogate data sensitivity ratings associated with established secure data corridors, secure data containers, and use cases associated with secure data containers. Additionally, the audit module may ensure that each of the secure data corridors and secure data containers comply with the control parameters of the transmitting data feeds.

In the illustrated example, the resource management platform 402 may further include input/output interface(s) 416. The input/output interface(s) 416 may include any type of output interface known in the art, such as a display (e.g. a liquid crystal display), speakers, a vibrating mechanism, or a tactile feedback mechanism. Input/output interface(s) 416 also include ports for one or more peripheral devices, such as headphones, peripheral speakers, or a peripheral display. Further, the input/output interface(s) 416 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

In the illustrated example, the resource management platform 402 may further include one or more network interface(s) 418. The one or more network interface(s) 418 may include any sort of transceiver known in the art. For example, the one or more network interface(s) 418 may include a radio transceiver that performs the function of transmitting and receiving radio frequency communications via an antenna. In addition, the one or more network interface(s) 418 may also include a wireless communication transceiver and a near field antenna for communicating over unlicensed wireless Internet Protocol (IP) networks, such as local wireless data networks and personal area networks (e.g. Bluetooth or near field communication (NFC) networks). Further, the one or more network interface(s) 418 may include wired communication components, such as an Ethernet port or a Universal Serial Bus (USB).

Figure 5:
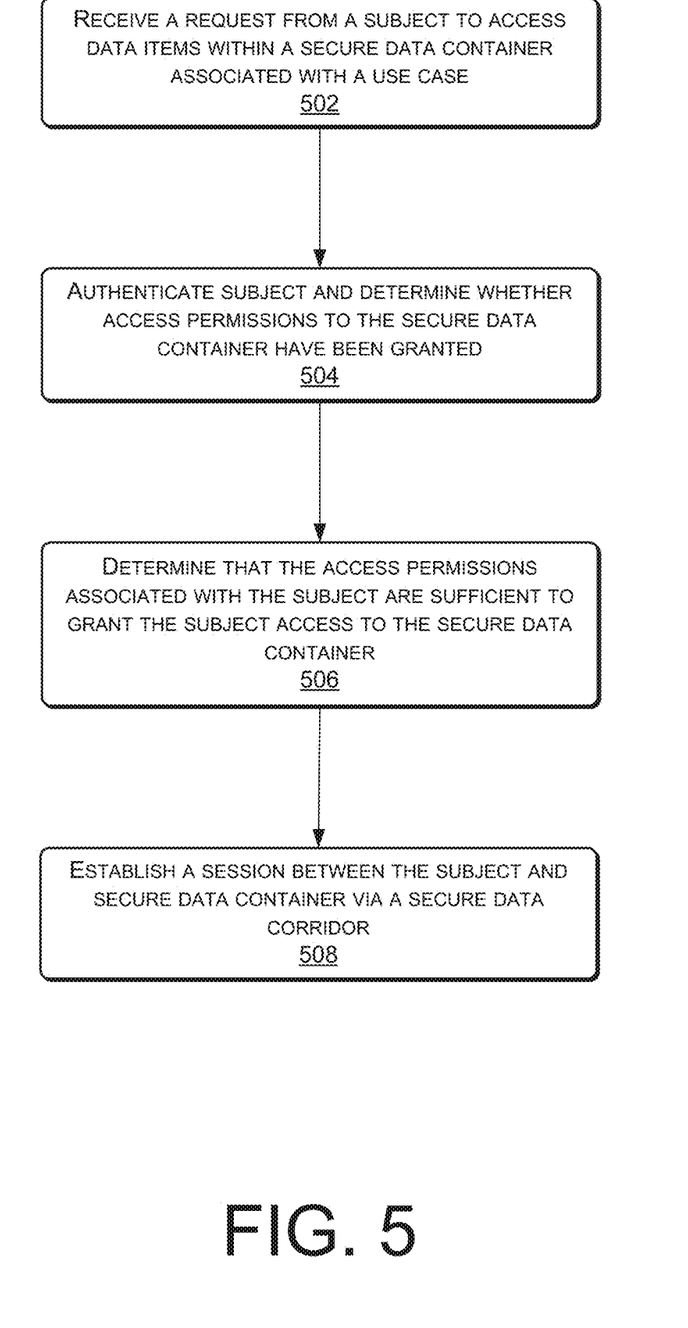
FIG. 5 illustrates a flow diagram that describes a process of establishing a session between a subject and a secure data container using a secure data corridor.
Figure 6:
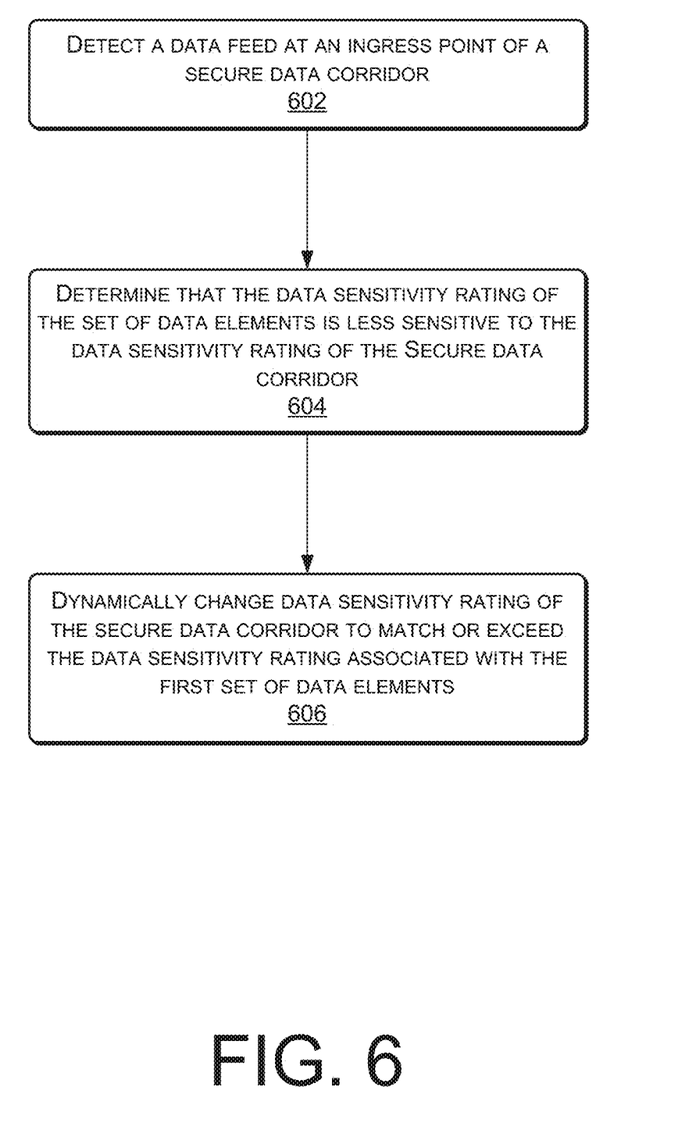
FIG. 6 illustrates a flow diagram that describes a process of dynamically setting a data sensitivity rating of a secure data corridor based at least in part on the data sensitivity of data feeds.

FIGS. 5 and 6 present illustrative processes 500 and 600 for establishing a session between a subject and a secure data container using a secure data corridor, and dynamically setting a data sensitivity rating of a secure data corridor based at least in part on the data sensitivity ratings of data feeds. Each of processes 500 and 600 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 500 and 600 are described with reference to the environment 100 of FIG. 1.

FIG. 5 illustrates a flow diagram that describes a process of establishing a session between a subject and a particular secure data container using a secure data corridor. In various examples, the subject may correspond to a user, a non-user entity, or another secure data corridor that requests permission to access data feeds within the particular secure data corridor. At 502, a resource management platform may receive a request from a subject to access data items within a secure data container. In some examples, the secure data container may be associated with a use case, whereby all data feeds within the secure data container retain a particular data sensitivity rating.

At 504, the resource management platform may authenticate an identity of the subject and determine whether access permissions to the secure data container have been granted. In some examples, access permissions may be associated with control parameters associated with data feeds. Further, permissions may be bound to specific control parameters stored in a list of triples that tie the subject to control parameters of data feeds. In other examples, access permissions may be tied to a use-case of the secure data container, such that the subject is permitted access to all data feeds associated with the use-case and/or the secure data container.

At 506, the resource management platform may determine that access permissions associated with the subject are sufficient to allow the subject access to the secure data container. The determination may be based at least in part on a comparison of the access permissions to the control parameters associate with data feeds within the secure data containers.

At 508, the resource management platform may establish a session link between the subject and the secure data container via secure data corridor. In various examples, the secure data corridor may be assigned a data sensitivity rating that is based on a data sensitivity rating of data feeds within the secure data container. Alternatively, the data sensitivity rating may be locked by an administrator based at least in part on use-case for the secure data container.

FIG. 6 illustrates a flow diagram that describes a process of auto-leveling the data sensitivity rating of a secure data corridor based at least in part on the data sensitivity of transmitting data feeds. In other words, the resource management platform may detect the data sensitivity rating of data feeds that transmitting through the secure data corridor, and dynamically set a substantially similar data sensitivity rating for the secure data corridor.

At 602, the resource management platform may detect a data feed at an ingress point of a secure data corridor. In a non-limiting example, the ingress point may correspond to an endpoint at the subject, whereby the incoming data feed may be intended to transmit from the subject, via the secure data corridor, and to an adjoining secure data container. In another non-limiting example, the ingress point may correspond to the secure data container, whereby the incoming data feed may be intended to transmit from the secure data container, via the secure data corridor, and to the subject.

At 604, the resource management platform may determine that a data sensitivity rating of the data feed is more sensitive than the data sensitivity rating of the secure data corridor. In other words, the data feed may mandate more data security measures to maintain sufficient data confidentiality and data integrity than what is provided by the data sensitivity rating of the secure data corridor.

At 606, the resource management platform may dynamically set a data sensitivity rating for the secure data corridor that is substantially similar to that of the data feed. In doing so, the confidentiality and the integrity of the data feed may not be compromised while transmitting through the secure data corridor.

What is claimed:
1. A system of a resource management platform, comprising:
one or more processors;
memory coupled to the one or more processors, the memory including one or more modules that are executable by the one or more processors to:
establish a secure data corridor to provide a secure pathway for transmitting data elements between a subject and a secure data container, the secure data corridor having a first data sensitivity rating for data transmission through the secure data corridor;
interrogate a nature of a data feed of a set of data elements at an ingress to the secure data corridor, the data elements being associated with data objects having control parameters that govern access to the data objects, the data elements inheriting the control parameters from the data objects, the data feed inheriting the control parameters from the data elements, and access by the subject to the data feed being governed by the control parameters of the data feed;
determine, from the interrogation of the nature of the data feed, a second data sensitivity rating of the set of data elements that corresponds to the control parameters;
determine whether the first data sensitivity rating of the secure data corridor is commensurate with the nature of the data feed in accordance with the relative values of the first data sensitivity rating of the secure data corridor and the second data sensitivity rating of the set of data elements; and
in response to determining that the second data sensitivity rating of the set of data elements is greater than the first data sensitivity rating of the secure data corridor, dynamically reconfigure the secure data corridor with a third data sensitivity rating that is greater than or equal to the second data sensitivity rating of the set of data elements to provide the secure pathway for the set of data elements between the subject and the secure data container with subject access permissions in accordance with the control parameters of the data feed;
wherein the control parameters include at least one of an explicit read provision, an explicit write provision, an explicit import provision, or an explicit export provision.
2. The system of claim 1, wherein the secure data corridor corresponds to a link layer, a network layer, a transport layer, or an application layer of a transmission control protocol (TCP) and internet protocol (IP).

3. The system of claim 1, wherein the secure data container corresponds to a first secure data container, and wherein the subject corresponds to a second secure data container.

4. The system of claim 1, wherein the second data sensitivity rating is a minimum threshold of data sensitivity to authorize the subject to access the set of data elements.

5. The system of claim 1, wherein to establish the secure data corridor between the subject and the secure data container is performed by the resource management platform that provides a policy access control point for transmitting the set of data elements between the ingress point and an egress point.

6. The system of claim 1, wherein the set of data elements is a first set of data elements, and wherein the one or more modules are further executable by the one or more processors to:
receive a message that includes a request to ingress an additional set of data elements into the secure data container;
determine an additional data sensitivity rating associated with the additional set of data elements;
determine that the additional data sensitivity rating is greater than the third data sensitivity rating of the secure data corridor; and
dynamically reconfigure the secure data corridor with a fourth data sensitivity rating that is greater than or equal to the additional data sensitivity rating.

7. The system of claim 1, wherein the set of data elements is a first set of data elements, and wherein the one or more modules are further executable by the one or more processors to:
receive a first message that includes a request from the subject to ingress an additional set of data elements, into the secure data container;
determine an additional data sensitivity rating associated with the additional set of data elements,
determine that the additional data sensitivity rating is greater than the third data sensitivity rating of the secure data corridor;
determine that the third data sensitivity rating of the secure data corridor is locked; and
transmit a second message to the subject indicating that the additional set of data elements cannot securely transmit through the secure data corridor.

8. The system of claim 1, wherein the first data sensitivity rating associated with the secure data corridor is dynamically set to be at least substantially similar to an additional data sensitivity rating associated with the secure data container.

9. The system of claim 1, wherein the control parameters are initially assigned to the data objects, wherein individual data objects are linked to one or more of the data elements, and the one or more data elements are further linked to individual data feeds via a diagraph of connectivity.

10. The system of claim 1, wherein the one or more modules are further executable by the one or more processors to:
receive a message that includes a request from the subject to ingress an additional set of data elements from the secure data container;
determine that the subject is unauthorized to read the additional set of data elements within the secure data container; and
configure the secure data corridor to prevent an egress of the additional set of data elements from the secure data container.

11. The system of claim 1, wherein the one or more modules are further executable by the one or more processors to:
receive a message that includes a request from the subject for ingress of an additional set of data elements to the secure data container;
determine that the subject is authorized to write data elements to the secure data container; and
configure the secure data corridor to transmit the additional set of data elements from the subject to the secure data corridor.

12. A computer-implemented method, comprising:
under control of one or more processors:
establishing a secure data corridor to provide a secure pathway for transmitting data elements between a subject and a secure data container, the secure data corridor having a first data sensitivity rating for data transmission through the secure data corridor;
interrogating a nature of a data feed of a set of data elements at an ingress to the secure data corridor, the data elements being associated with data objects having control parameters that govern access to the data objects, the data elements inheriting the control parameters from the data objects, the data feed inheriting the control parameters from the data elements, and access by the subject to the data feed being governed by the control parameters of the data feed;
determining, from the interrogation of the nature of the data feed, a second data sensitivity rating of the set of data elements that corresponds to the control parameters;
determining whether the first data sensitivity rating of the secure data corridor is commensurate with the nature of the data feed in accordance with the relative values of the first data sensitivity rating of the secure data corridor and the second data sensitivity rating of the set of data elements; and
in response to determining that the second data sensitivity rating of the set of data elements is greater than the first data sensitivity rating of the secure data corridor, dynamically reconfiguring the secure data corridor with a third data sensitivity rating that is greater than or equal to the second data sensitivity rating of the set of data elements to provide the secure pathway for the set of data elements between the subject and the secure data container with subject access permissions in accordance with the control parameters of the data feed;
wherein the control parameters include at least one of an explicit read provision, an explicit write provision, an explicit import provision, or an explicit export provision.

13. The computer-implemented method of claim 12, further comprising:
identifying control parameters associated with individual data elements of the set of data elements;
determining individual data sensitivity ratings for the individual data elements, based at least in part on the control parameters; and
determining that the individual data sensitivity ratings of a portion of the individual data elements are greater than the first data sensitivity rating of the secure data corridor, wherein, dynamically reconfiguring the secure data corridor with the third data sensitivity rating is based at least in part on the portion of the individual data elements.

14. The computer-implemented method of claim 13, wherein the portion of the individual data elements is a first portion of the individual data elements, and further comprising:
determining that the individual data sensitivity ratings of a second portion of the individual data elements is more sensitive than the second data sensitivity rating of the secure data corridor, the second data sensitivity rating being a maximum threshold of sensitivity for transmission of data elements through the secure data corridor; and
transmitting an indication to the subject indicating that content of the second portion of the individual data elements cannot be securely transmitted through the secure data corridor.

15. The computer-implemented method of claim 12, further comprising:
receiving a message that includes a request from the subject for egress of an additional set of data elements from the secure data container;
determining individual data sensitivity ratings of a portion of the additional set of data elements;
determining that individual data sensitivity ratings of the portion of the additional set of data elements is greater than the third data sensitivity rating of the secure data corridor; and
dynamically setting a fourth data sensitivity rating of the secure data corridor to be greater than or equal to the individual data sensitivity ratings of the portion of the additional set of data elements.

16. The computer-implemented method of claim 12, wherein the third data sensitivity rating associated with the secure data corridor is locked.

17. One or more non-transitory computer-readable media storing computer-executable instructions, that when executed on one or more processors, causes the one or more processors to perform acts comprising:
establishing a secure data corridor to provide a secure pathway for transmitting data elements between a subject and a secure data container, the secure data corridor having a first data sensitivity rating for data transmission through the secure data corridor;
interrogating a nature of a data feed of a set of data elements at an ingress to the secure data corridor, the data elements being associated with data objects having control parameters that govern access to the data objects, the data elements inheriting the control parameters from the data objects, the data feed inheriting the control parameters from the data elements, and access by the subject to the data feed being governed by the control parameters of the data feed;
determining, from the interrogation of the nature of the data feed, a second data sensitivity rating of the set of data elements that corresponds to the control parameters;
in response to determining that the second data sensitivity rating of the set of data elements is greater than the first data sensitivity rating of the secure data corridor, dynamically reconfiguring the secure data corridor with a third data sensitivity rating that is greater than or equal to the second data sensitivity rating of the set of data elements to provide the secure pathway for the set of data elements between the subject and the secure data container with subject access permissions in accordance with the control parameters of the data feed;
wherein the control parameters include at least one of an explicit read provision, an explicit write provision, an explicit import provision, or an explicit export provision.

18. The one or more non-transitory computer-readable media of claim 17, further comprising:
generating a security label for individual data feeds that associate the individual data feeds with corresponding data elements, corresponding data objects, and associated control parameters;
generating a linkage map-set of the individual data feeds that include a plurality of entries, wherein individual entries of the plurality of entries correspond to the security label for the individual data feeds; and
auditing a data sensitivity of the individual data feeds being transmitted through the secure data corridor, the data sensitivity being based at least in part on security labels within the linkage map-set.

19. The one or more non-transitory computer-readable media of claim 18, wherein an associated control parameter of the associated control parameters corresponds to a particular data sensitivity rating, the associated control parameter further comprising a permission lattice of an explicit read provision, an explicit write provision, an explicit import provision, and an explicit export provision that corresponds to the particular data sensitivity rating relative to other data sensitivity ratings.

* * * * *